US005081837A

United States Patent [19]

Ueno

[11] Patent Number: 5,081,837

[45] Date of Patent: Jan. 21, 1992

[54] HYDRAULIC CONTROL CIRCUIT

[75] Inventor: Katsumi Ueno, Saitama, Japan

[73] Assignee: Diesel KIKI Co., Ltd., Tokyo, Japan

[21] Appl. No.: 329,674

[22] Filed: Mar. 28, 1989

[30] Foreign Application Priority Data

Apr. 8, 1988 [JP] Japan .................................. 63-46812

[51] Int. Cl.[5] .............................................. F16D 31/02

[52] U.S. Cl. ........................................ 60/421; 60/430; 60/468; 60/486

[58] Field of Search ................. 60/421, 422, 430, 468, 60/486; 91/518

[56] References Cited

U.S. PATENT DOCUMENTS

| | | | |
|---|---|---|---|
| 3,760,689 | 9/1973 | Johnston | 60/421 X |
| 3,922,854 | 12/1975 | Coeurderoy | 60/486 X |
| 3,968,811 | 7/1976 | Fillion | 60/421 X |
| 3,975,909 | 8/1976 | McBurnett | 60/421 |
| 4,089,166 | 5/1978 | Ratliff et al. | 60/421 |
| 4,141,280 | 2/1979 | Lorimor | 60/486 X |
| 4,164,119 | 8/1979 | Parquet | 60/430 X |
| 4,712,375 | 12/1987 | Kauss et al. | 60/422 X |
| 4,819,430 | 4/1989 | Becker | 60/421 |

FOREIGN PATENT DOCUMENTS

| | | |
|---|---|---|
| 51-60877 | 5/1976 | Japan . |
| 58-37303 | 8/1981 | Japan . |

*Primary Examiner*—John T. Kwon

*Assistant Examiner*—Thomas Denion

*Attorney, Agent, or Firm*—Nields & Lemack

[57] ABSTRACT

A hydraulic control circuit adequate to control a main hydraulic actuator and auxiliary hydraulic actuators. The main actuator drives farm machinery mounted to an agricultural tractor or the like. The auxiliary actuators drive farm attachments independent of said farm machinery. At least two hydraulic pumps and at least two sets of control valves are connected in series. The exit of one hydraulic pump is connected with the other hydraulic pump via a check valve. Said one hydraulic pump is connected with a tank via an openable valve upstream of the check valve. The upstream set of control valves is used to control the auxiliary hydraulic actuators needing more flow rate than the downstream set of control valves. The openable valve has an offset valve at its one end to determine the direction of flow. The openable valve is either opened or closed by the pressure admitted from the downstream side of the upstream set of control valves. Thus, when the upstream set of control valves needing more flow rate is not operated, only the oil delivered from the other hydraulic pump flows into the circuit. When the upstream set of valves is operated, the oil delivered from one pump meets the oil delivered from the other pump, increasing the pump capacity. Hence, the speed of the farm attachments can be adjusted without the need to modify the preset speed of the machinery.

8 Claims, 2 Drawing Sheets

HYDRAULIC CONTROL CIRCUIT

FIELD OF THE INVENTION

The present invention relates to a hydraulic control circuit and, more particularly, to a hydraulic control circuit adequate to control farm machinery pulled by an agricultural tractor and farm attachments for the tractor.

BACKGROUND OF THE INVENTION

Farm machinery such as a plow is mounted to the rear of the body of an agricultural tractor via a link mechanism that is hitched at three points. The link mechanism is driven by a hydraulic actuator which is usually a single-acting cylinder. This hydraulic actuator is controlled by a hydraulic control circuit including hydraulic pumps and control valves, as described in Japanese Patent Laid-Open No. 28,501/1987.

In recent years, even agricultural tractors having relatively small horsepower, e.g., of the order of 30 H.P., have been required to do not only normal plow works but also other associated works. Thus, many tractors are equipped with one or more hydraulically operated attachments independent of the front of the vehicle and of the body, as well as the aforementioned hydraulic actuator that acts as a main hydraulic actuator.

One typical example of attachment mounted on the body of a tractor is a front loader. A typical example of a farm attachment independent of the body of a tractor is a water pump. A hydraulic actuator (hereinafter referred to as an auxiliary hydraulic actuator) for the former attachment comprises a plurality of hydraulic cylinders. A hydraulic actuator for the latter attachment is a hydraulic motor. Of course, the auxiliary hydraulic actuator is controlled by a control valve. Generally, therefore, the whole hydraulic control circuit comprises a control valve for the main hydraulic actuator and a second control valve for the auxiliary hydraulic actuator. The control valves are connected in series with a hydraulic pump.

For an agricultural tractor, the size of the vehicle, or horsepower, is first determined. The specifications of the farm machinery are then determined according to the size. Usually, the flow rate of the hydraulic pump, the capacity of the hydraulic cylinder, and the capacities of the control valves are determined to set the rising speed and the lowering speed of the farm machinery within a given range. Accordingly, if the flow rate needed to control the auxiliary hydraulic actuator that drives the farm attachment lies within the range of the flow rate of the hydraulic pump, then no problems will occur.

Sometimes, however, a flow rate larger than the flow rate of the hydraulic pump is needed in controlling the auxiliary hydraulic actuator, i.e., the flow rate is increased. In reality, a hydraulic cylinder of a large capacity typified by a hydraulic cylinder for a front loader is employed as an auxiliary hydraulic actuator. One conceivable method of satisfying the above requirement is to use a hydraulic pump of a large capacity, for providing large flow rates. In this case, however, excessive flow rate is supplied to the main hydraulic actuator when this actuator is operated without operating the auxiliary hydraulic actuator. As a result, the speed of the farm machinery becomes too high, and the machinery is controlled with decreased accuracy.

Japanese Utility Model Laid-Open No. 56,802/1987 discloses a control circuit in which delivery passages extending from two hydraulic pumps are connected with a hydraulic actuator via a plurality of multistage combining selector valves to control the speed of a single hydraulic actuator. This control circuit is unable to control the speeds of two or more hydraulic devices simultaneously. More importantly, it is impossible for the circuit to operate the main hydraulic actuator without changing the predetermined velocity and to smoothly operate the auxiliary hydraulic actuator which needs a large flow rate only when the need arises.

SUMMARY OF THE INVENTION

The present invention has been made to solve the foregoing problems.

It is an object of the invention to provide a hydraulic control circuit which can operate a main hydraulic actuator without modifying the preset velocity and which, when an auxiliary hydraulic actuator needing a large flow rate is operated, supplies a sufficient amount of oil to the auxiliary actuator, permitting the velocity to be adjusted at will.

It is another object of the invention to provide a hydraulic control circuit which is simple in structure and hence economical to fabricate but can function as described in the preceding paragraph.

It is a further object of the invention to provide a hydraulic control circuit adapted for agricultural vehicles such as tractors and combine harvesters equipped with both main farm machinery and farm attachment, as well as for various construction vehicles.

Briefly, the invention provides a hydraulic circuit which controls both a main hydraulic actuator and auxiliary hydraulic actuators according to the manner in which the actuators are used. The main actuator must be so controlled that the flow rate is maintained constant. The auxiliary actuators need a larger flow rate than the flow rate of the main actuator. The hydraulic circuit essentially comprises at least two hydraulic pumps driven by a common power source and two or more sets of control valves. They are connected in series. Each set of control valves includes at least one directional control valve.

An operable valve is connected to the delivery passage extending from one hydraulic pump. The exit port of the valve is connected with a tank port. The delivery passage extending from said one hydraulic pump is connected with the delivery passage extending from the other hydraulic pump, via a check valve parallel with the openable valve on the downstream side of the openable valve to form a combining passage. This combining passage is connected to the upstream side of the first set of control valves.

The openable valve has an offset spring at its one end to determine the normal direction of flow. Pressure is admitted to the other end of the valve which is opposite to the offset spring, from the downstream side of the first set of control valves. The openable valve is either opened or closed by the pressure.

Preferably, the openable valve is a spring offset two-position selector valve. The intake port is connected with the delivery passage extending from one hydraulic pump via a branch passage. The exit port is connected with a tank passage for the first set of control valves through a bypass line. A pressure chamber is formed opposite to the offset spring and connected with a communication passage which connects the first set of control valves with the next set of control valves by a pilot passage.

The force of the offset spring of the operable valve can be either weaker or stronger than the pressure of the reciprocating fluid. In the former case, the intake port of the operable valve is in communication with the exit port even when the first and next sets of control valves are in their neutral positions. Therefore, the oil delivered by one hydraulic pump flows into the tank passage through the branch passage and the bypass line. In the latter case, when the first and next sets of control valves are in their neutral positions, the intake port of the openable valve is disconnected from the exit port. Therefore, the oil streams delivered from the hydraulic pumps meet.

In the above-described structure, the hydraulic pumps are rotated by the same shaft and so the flow rate of fluid flowing into the circuit corresponds to the rotational speed. When the downstream set of control valves is operated to activate the main hydraulic actuator for the farm machinery, the intake port of the openable valve is in communication with the exit port irrespective of the set force of the offset spring. Thus, the fluid delivered by one pump enters the tank. Only the fluid delivered by the other hydraulic pump flows into the circuit.

When the upstream set of control valves is operated to activate the auxiliary hydraulic actuator for farm attachments, the flow rate of fluid used by this set of valves is large. The flow rate of fluid flowing into the downstream set of valves decreases accordingly. This reduces the pilot signal pressure applied to the pressure chamber opposite to the offset spring of the openable valve. Then, the openable valve is switched to other state such that the intake port is disconnected from the exit port. As a result, the oil streams from the hydraulic pumps meet, increasing the pump capacity. In this way, a sufficient amount of fluid is sent to the upstream set of control valves. Consequently, the attachments can be controlled at a high speed.

Other objects and features of the invention will appear in the course of the description thereof which follows.

DESCRIPTION OF THE PREFERRED EMBODIMENT

Figure 1:
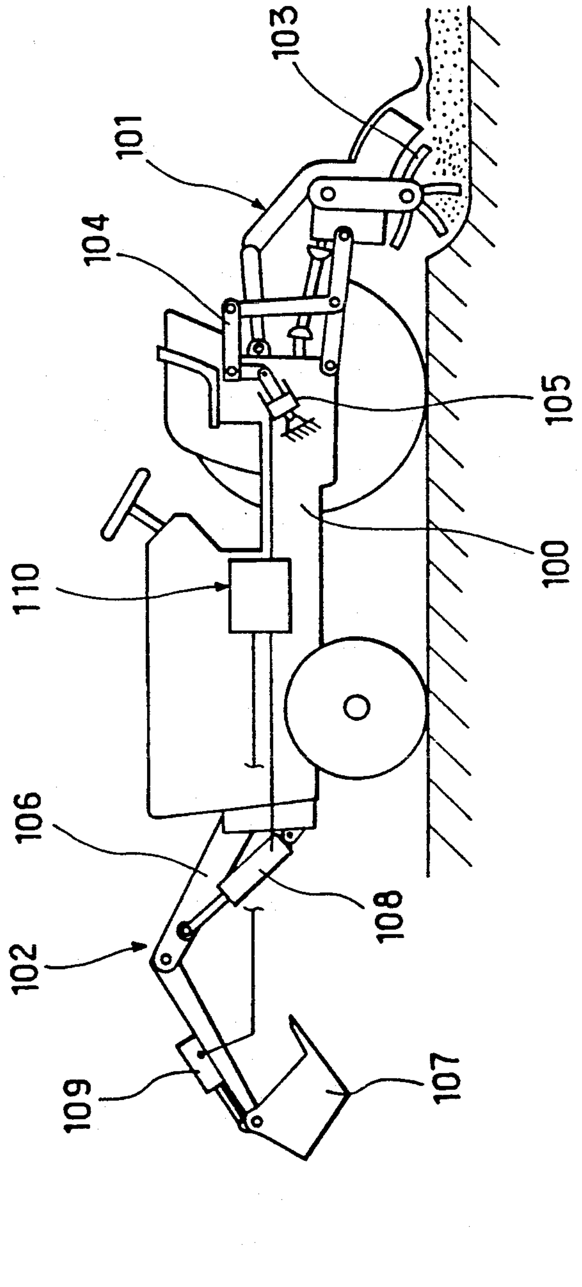
FIG. 1 is a side elevation of an agricultural tractor according to the invention.

Referring to FIG. 1, there is shown an agricultural tractor according to the invention. The body of the tractor is indicated by numeral 100. Farm machinery 101 is mounted to the rear of the body 100 and comprises a plow 103, a link mechanism 104 hitched at three points, and a main hydraulic actuator 105 for controlling the movement of the link mechanism 104. The actuator 105 consists of a single-acting cylinder.

A farm attachment 102 is also mounted to the body 100. The attachment 102 can be of any kind of machine. Of course, it can be a water pump. In this specific example, the attachment is a front loader which comprises a boom 106, a bucket 107, auxiliary hydraulic actuators 108 and 109. In this example, each auxiliary hydraulic actuator is a hydraulic cylinder. One of the two hydraulic cylinders is used for the boom, while the other is employed for the bucket. Of course, further hydraulic cylinders and hydraulic motors can be added for an arm, outrigger, etc. Where the attachment is a water pump, the auxiliary hydraulic actuator comprises a single hydraulic motor. A hydraulic unit 110 uses a hydraulic control circuit according to the invention, and is mounted at a suitable location inside the body 100.

Figure 2:
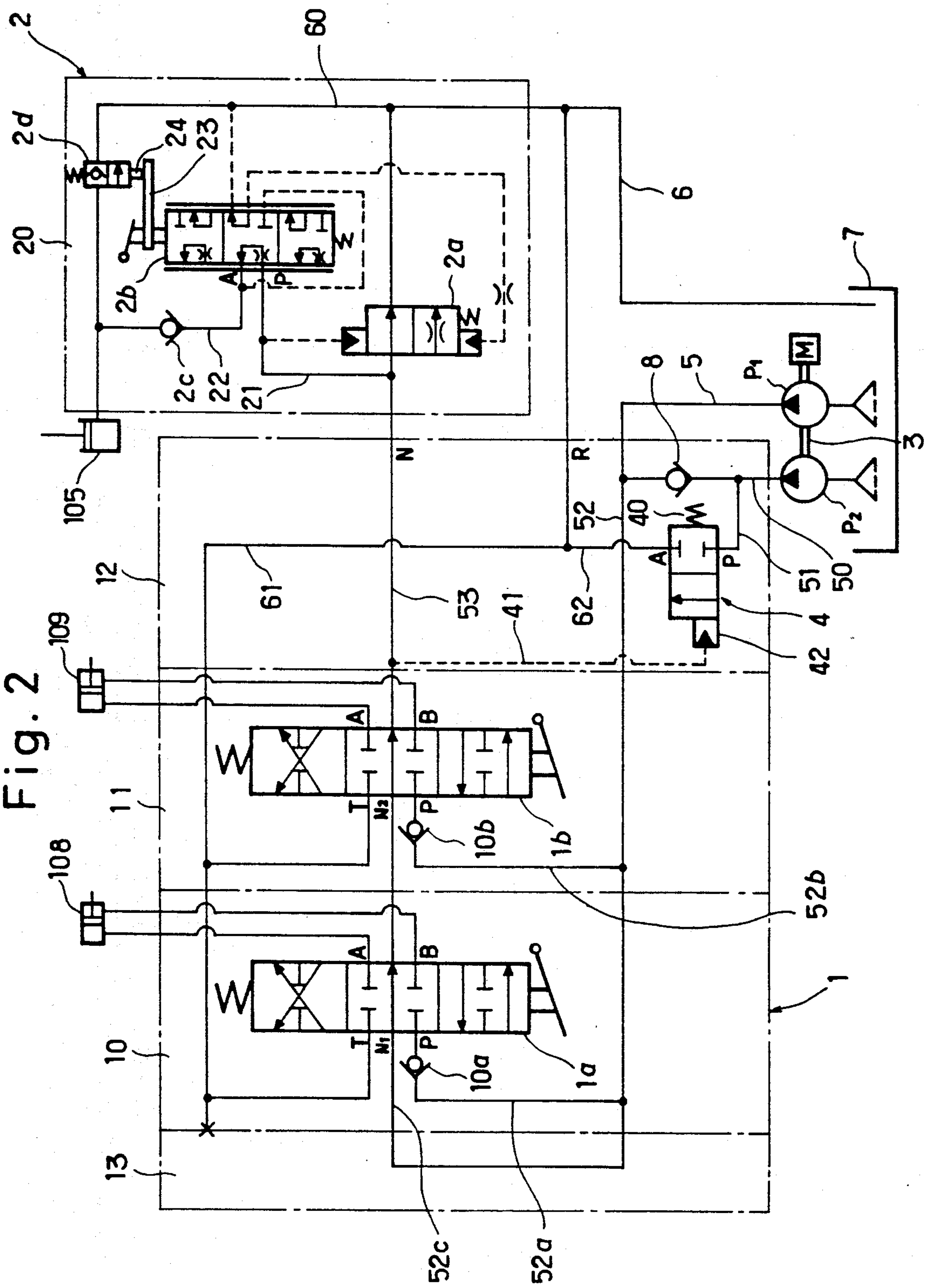
FIG. 2 is a diagram of a hydraulic control circuit according to the invention.

FIG. 2 particularly shows the hydraulic unit 110. This unit includes a first hydraulic pump $P_1$, a second hydraulic pump $P_2$, a first, or upstream, set of control valves 1, a second, or downstream, set of control valves 2, and a hydraulic tank 7.

The first set of control valves 1 is used to control the auxiliary hydraulic actuators 108 and 109. In this example, the first set of valves 1 includes two selector valves 1*a* and 1*b* which has six ports and takes three positions. The valves 1*a* and 1*b* are mounted in valve bodies 10 and 11, respectively, and interconnected. The valves 1*a* and 1*b* have cylinder ports A and B which are connected with the cylinder ports in the valve bodies 10 and 11, respectively. These cylinder ports are connected to the pistons and the rods of the actuators 108 and 109, respectively.

The second set of valves 2 serves to control the main hydraulic actuator 105. The second set of valves 2 forces oil into the main actuator 105 via a selector valve and a check valve. Pressure oil is returned to the tank from the main actuator 105 through a selector valve or other valve.

In this example, the second set of control valves comprises hitch control valves and is comprised of a valve body 20 in which an unloading valve 2*a*, a rising valve 2*b*, a check valve 2*c*, and a lowering valve 2*d* are mounted. The unloading valve 2*a* consists of a pilot control valve that is a combination of a flow control valve having a restrictor. The intake port of the unloading valve 2*a* is connected with the final selector valve 1*b* of the first set of control valves 1 via a carry-over port N and a communication passage 53. The exit port of the unloading valve 2*a* is connected with the hydraulic tank 7 through a tank passage 6.

The rising valve 2*b* consists of a selector valve of the tracer type which has five ports and assumes three positions. Two ports P and A on one side are connected with each other via a restrictor. The intake port P is connected with a passage 21 branching off from the upstream side of the intake port of the unloading valve 2*a*. The output port A is connected with the main actuator 105 via a passage 22 having a check valve 2*c*.

The lowering valve 2*d* is a two-position selector valve having a check valve. The valve 2*d* has a push rod 24. When the rod 24 is pushed by the arm 23 of the rising valve 2*b*, the valve 2*d* is switched to other state. The exit of the lowering valve 2*d* is connected with a tank passage 60 branching off from the tank passage 6. The entrance is connected with the passage 22 extending to the main hydraulic actuator 105.

The first hydraulic pump $P_1$ is connected with the second hydraulic pump $P_2$ by a common shaft 3. The pumps are simultaneously driven by an arbitrary power source. In this example, the power source is an engine M installed on the body 100. Usually, the capacity of the first hydraulic pump $P_1$ is larger than that of the second hydraulic pump $P_2$. Where the tractor is an agricultural tractor of 25 H.P., the capacity of the first pump $P_1$ is 40 to 45 l/min., while the capacity of the second pump $P_2$ is 25 to 30 l/min. If necessary, however, they can be made equal in capacity.

The exit port of the first hydraulic pump $P_1$ is connected with a delivery passage 5 consisting of a pipe. The first set of control valves 1 has an auxiliary body 12 provided with a pump passage 52 with which the delivery passage 5 is connected. The pump passage 52 branches into port passages 52*a* and 52*b* inside the valve bodies 10 and 11 of the selector valves 1*a* and 1*b*, respectively. The port passages 52*a* and 52*b* are in communication with the ports P of the pumps. The pump passage 52 extends through both the valve body 10 and an end plate 13 and forms a circulatory passage 52*c* which is connected in series with the neutral ports $N_1$ and $N_2$ of the first selector valve 1*a* and the second selector valve 1*b* in this order. The neutral port $N_2$ of the second selector valve 1*b* is connected with the communication passage 53 as mentioned previously. Pump ports $P_a$ and $P_b$ of the first selector valve 1*a* and the second selector valve 1*b* are connected with the port passages 52*a* and 52*b*, respectively, via check valves 10*a* and 10*b*, respectively. Tank ports $T_a$ and $T_b$ are connected with a tank passage 61 that extends through the valve bodies 10, 11 and the auxiliary body 12. One end of the tank passage 61 is closed up by a plug. The other end is connected to the hydraulic tank 7 via the port R of the auxiliary body 12 or to the tank passage 6 in the second set of control valves 2 as shown in FIG. 2.

The exit port of the second hydraulic pump $P_2$ is connected in parallel with the pump passage 52 in the first pump $P_1$ by a delivery passage 50 equipped with a check valve 8. Therefore, the fluid streams from the pumps $P_1$ and $P_2$ meet and flow into the first selector valve 1*a*.

A valve 4 which is opened and closed is incorporated in the auxiliary body 12. The openable valve 4 consists of a two-position selector valve having two ports. The valve 4 can have a restrictor. The intake port P of the valve 4 is connected with a branch passage 51 branching off from the delivery passage 50 extending from the second pump $P_2$. The port P is connected to the passage 51 at a location on the upstream side of the check valve 8. The exit port A of the openable valve 4 is connected with a bypass line 62 that is connected with a branch tank passage 61 in the auxiliary body 12.

The valve 4 has an offset spring 40 at its one end to urge a spool toward the direction to close the valve. A pilot pressure chamber 42 is formed at the other end and in communication with a pilot passage 41 which is connected with a communication passage 53. This passage 53 connects the neutral port at the exit of the second selector valve 1*b* with the pump port of the unloading valve 2*a*.

The force of the offset spring 40 is so set that the valve 4 is opened with a pressure lower than the pressure of the fluid circulating through the pump, e.g., less than 4 to 5 $Kg/cm^2$. If necessary, the spring force can be set larger than the pressure of the circulating fluid. Preferably, the openable valve 4, the check valve 8, the branch passage 51, the pump passage 52, the bypass line 62, the pilot passage 41, the communication passage 53, and the tank passage 61 are incorporated as a unit in the auxiliary body 12.

In operation, the first hydraulic pump $P_1$ and the second hydraulic pump $P_2$ are rotated coaxially by the engine M. Fluid is expelled into the delivery passages 5 and 50 at a flow rate corresponding to the rotational frequency. When neither the first set of control valves 1 nor the second set of control valves (hitch control valves) 2 is operated, i.e., they are in their neutral positions, the spool shifts to the right from the condition shown in FIG. 2, provided that the force of the offset spring 40 of the openable valve 4 is set less than the pressure of the circulating oil. Then, the intake port P is placed in communication with the exit port A.

As a result, the pressure oil delivered from the second hydraulic pump $P_2$ flows into the tank port via the openable valve 4. That is, the oil returns to the hydraulic tank 7 through the delivery passage 50, the branch passage 51, the bypass line 62, and the tank passage 61. The oil expelled from the first hydraulic pump $P_1$ goes back to the tank 7 through the delivery passage 5, the pump passage 52, the circulatory passage 52*c* in the first and second selector valves 1*a*, 1*b*, the communication passage 53, the unloading valve 2*a* of the second set of control valves 2, and the tank passage 6.

When the second set of control valves 2 is operated to activate the farm machinery 101, i.e., when the selector valve 2*b* is operated, the pilot pressure is sent to the unloading valve 2*a*, switching the valve to other state. That is to say, the rising valve 2*b* is pushed in (pushed in the downward direction in FIG. 2) so that the oil in line 22 can flow into the bottom of the unloading valve 2*a* to push it in the upward direction in FIG. 2. At this time, the arm 23 moves away from the push rod 24 (i.e. the rod 23 moves in the downward direction in FIG. 2). Then, the valve restricts the flow rate, increasing further the pressure of oil flowing through the communication passage 53, the pressure being larger than the pressure of the circulating oil. Since the signal pressure is sent into the pressure chamber 42 in the operable valve 4 from the pilot passage 41, the valve 4 is maintained in its neutral position. Therefore, the oil delivered from the second pump $P_2$ is returned to the hydraulic tank 7. Only the oil expelled from the first pump $P_1$ flows into the second set of control valves 2. That is, the oil is sent to the hydraulic actuator 105 via the passages 21, 22, and the check valve 2*c*. Later, in order to lower the pressure against the piston rod of the hydraulic actuator 105, the arm 23 is moved against the push rod 24 (i.e., the arm 23 is moved upward in the upward direction in FIG. 2), pushing the push rod 24 in (i.e., in the upward direction in FIG. 2) so as to open the lowering valve 2*d* and permit the oil to run from the hydraulic actuator 105 into the tank passage 60.

The rising valve 2*b* of FIG. 2 is shown in a neutral position which is midway between the pushed-down position for supplying oil under pressure to the hydraulic actuator 105 and the pushed-up position for releasing oil from the hydraulic actuator 105 into the tank passage 60. The spool of the rising valve 2*b* of an agricultural tractor is automatically returned to this neutral position by a conventional feedback link with which the piston rod of a conventional hydraulic actuator 105 is provided. Such conventional constructions are well known and are disclosed, for example, in Japanese Patent Laid-Open Specifications Nos. 60877/76 and 37303/83.

When the farm machinery 101 is not in operation, if at least one of the selector valves 1*a* and 1*b* of the first set of valves 1 is operated to start the farm attachment 102, the amount of oil which is bled off by flowing from the downstream selector valve 1*b* to the second set of valves 2 through the communication passage 53 decreases. The result is that the signal pressure which enters the pressure chamber 42 in the operable valve 4 from the communication passage 53 via the pilot passage 41 decreases below the pressure of the circulating oil. Then, the force of the offset spring 40 closes the valve 4, thus disconnecting the intake port P from the exit port A. Consequently, the oil stream from the first pump $P_1$ and the oil stream from the second pump $P_2$ meet and flow into the first set of valves 1. It substantially follows that the capacity of the pump increases. Since more fluid is supplied to the first selector valve 1*a* and the second selector valve 1*b*, if the capacity of the auxiliary hydraulic actuators 108 or 109 or the capacities of both actuators are large, a sufficient amount of oil can be supplied. Hence, the auxiliary hydraulic actuators can be controlled at a high speed.

Where the force of the offset spring 40 is set larger than the pressure of oil circulating through the pumps, the openable valve 4 is maintained closed as shown in FIG. 1 if the first set of valves 1 and the second set of valves 2 are in their neutral positions. In this condition, the oil from the first pump $P_1$ and the oil from the second pump $P_2$ meet. If the pressure is increased by operating the second set of control valves 2, the pressure change is transmitted to the pressure chamber 42 through the pilot passage 41. Then, the valve 4 is opened against the force of the offset spring 40. This permits the oil from the second pump $P_2$ to escape into the hydraulic tank 7.

What is claimed is:

1. A hydraulic circuit for controlling a main hydraulic actuator 105 adapted to drive a farm operation machine mounted on an agricultural tractor and auxiliary hydraulic actuators adapted to drive farm attachment operation machine independent of said farm operation machine; said hydraulic control circuit comprising in combination a first hydraulic pump ($P_1$), a second hydraulic pump ($P_2$), said first and second pumps being adapted to be coaxially driven by one power source, said first hydraulic pump delivering fluid under pressure to a common pump passage 52 through which said fluid travels to a first control valve group (1), and thereafter to a second control valve group (2), each of said control valve groups being provided with at least one switch valve respectively, said first control valve group (1) being for the auxiliary hydraulic actuators, and said second control valve group (2) being for the main hydraulic actuator; said second hydraulic pump delivering fluid under pressure to a delivery passage (50) said delivery passage (50) communicating with said common pump passage (52) via a check valve (8); an openable valve (4) comprising a spring-offset-type two-position switching valve, said openable valve (4) having an intake port (P) connected to the delivery passage (50) via a branch passage (51), and an exit port (A) connected to a tank passage (61) of the first control valve group 1 through a bypass line (62), said openable valve (4) having a pressure chamber (42) at one side thereof and an offset spring (40) at the opposite side thereof, said pressure chamber (42) being connected, via a pilot passage (41), to a communication passage (53) between the first control valve group (1) and the second control valve group (2); said openable valve (4) being actuated by pressure introduced into the pressure chamber (42) from the downstream side of the first control valve group (1), and when only the second control valve group (2) is operated, the discharge amount of the second hydraulic pump ($P_2$) is not united with the discharge amount of the first hydraulic pump ($P_1$), but only when the first control valve group (1) is operated, the discharge amount of the second hydraulic pump ($P_2$) is united with the discharge amount of the first hydraulic pump ($P_1$).

2. The hydraulic control circuit of claim 1, wherein the force of the offset spring (40) is weaker than the pressure of the oil circulating through the pumps such that the intake port (P) of the openable valve (4) is maintained in communication with the exit port (A) even when the upstream and downstream sets of control valves (1,2) are in their neutral positions.

3. The hydraulic control circuit of claim 1, wherein the force of the offset spring (40) is larger than the pressure of the oil circulating through the pumps such that the intake port (P) of the openable valve (4) is disconnected from the exit port (A) when the upstream and downstream sets of control valves (1,2) are in their neutral positions.

4. The hydraulic control circuit of any one of claim 1, wherein the openable valve (4) and the check valve (8) are mounted in an auxiliary body (12) together with the delivery passage (50), the branch passage (51), the bypass line (62), the pilot passage (41), and wherein this assembly cooperates with the upstream set of control valves (1) to form a multiple unit valve.

5. The circuit as claimed in claim 1, wherein the main oil pressure actuator (105) is an hydraulic cylinder of the farm operation machine, and the control valve group (2) at the downstream side is a hitch control valve for controlling said hydraulic cylinder.

6. The circuit as claimed in claim 1, wherein the auxiliary hydraulic actuators are a plurality of hydraulic cylinders for front loaders, and the control valve group (1) at the upstream side has at least two switching valves.

7. The circuit as claimed in claim 1, wherein the auxiliary actuators are hydraulic motors for driving water pumps.

8. The circuit as claimed in claim 1, wherein the capacity of said first hydraulic pump ($P_1$) is larger than that of said second hydraulic pump ($P_2$).

* * * * *